March 17, 1964          F. W. CREEDLE ETAL          3,125,185
                        RAILROAD CAR RETARDERS
Filed July 8, 1960                              7 Sheets-Sheet 1
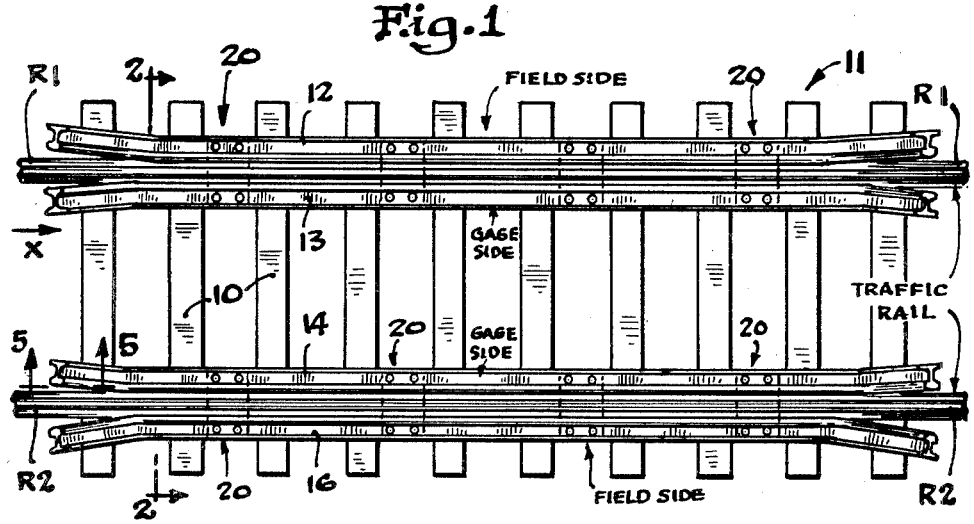
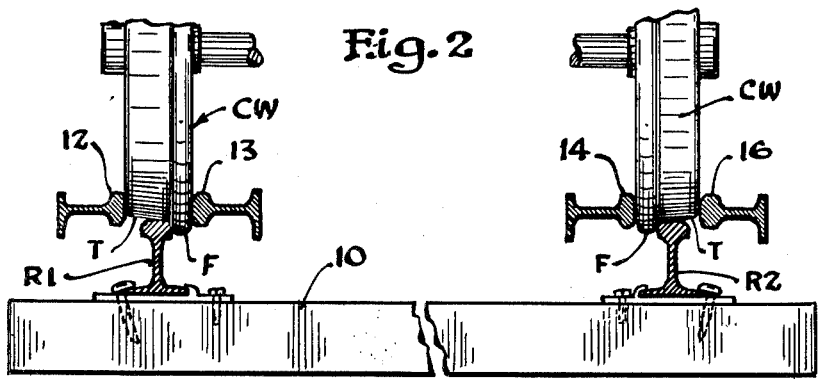
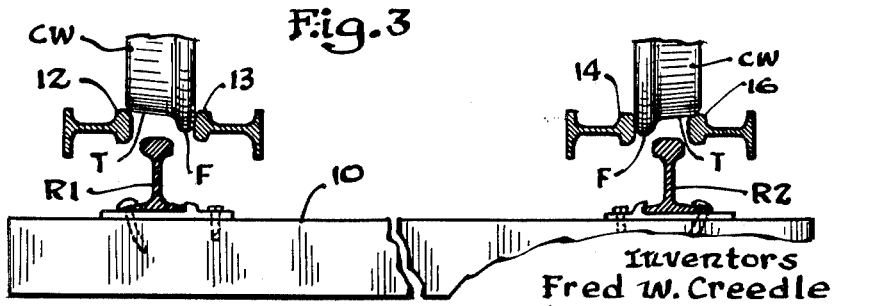
Inventors
Fred W. Creedle
Nicholas N. Dohrn
John Roy Wilhelm
By Wallace, Kinzer & Dorn
Attorneys March 17, 1964
F. W. CREEDLE ETAL
3,125,185
RAILROAD CAR RETARDERS
Filed July 8, 1960
7 Sheets-Sheet 2
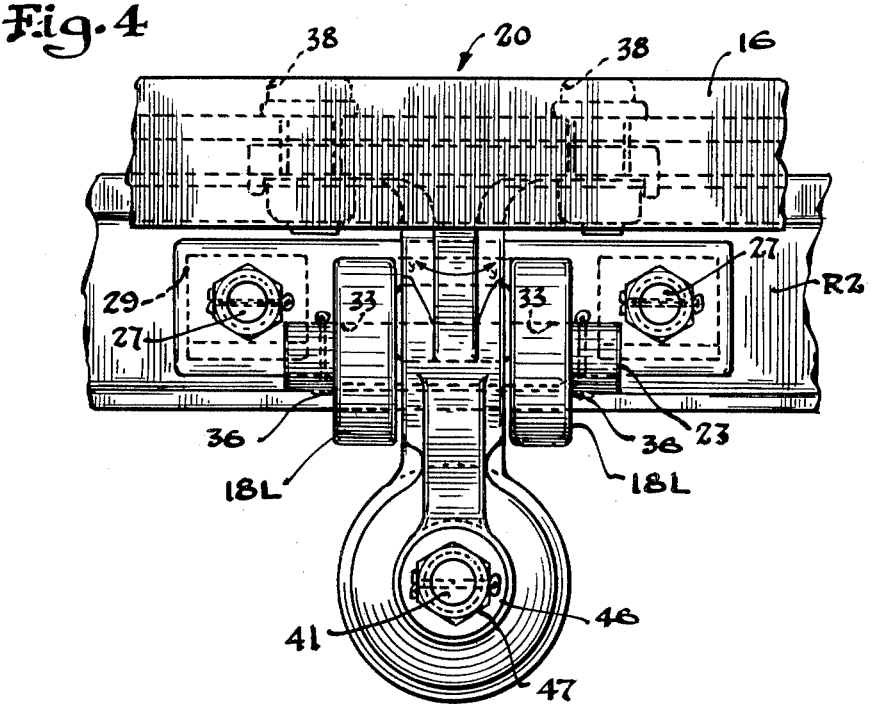
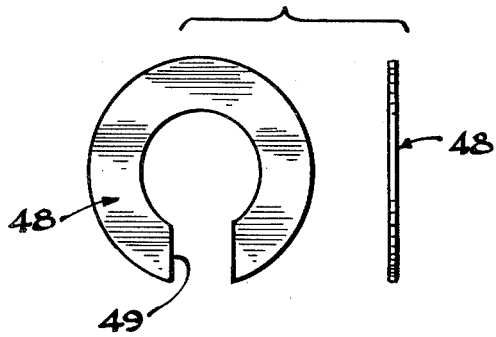
Inventors
Fred W. Creedle
Nicholas N. Dohrn
John Roy Wilhelm
By Wallace, Kinzer & Dorn
Attorneys Inventors
Fred W. Creedle
Nicholas N. Dohrn
John Roy Wilhelm
By Wallace, Kinzer & Dorn
Attorneys

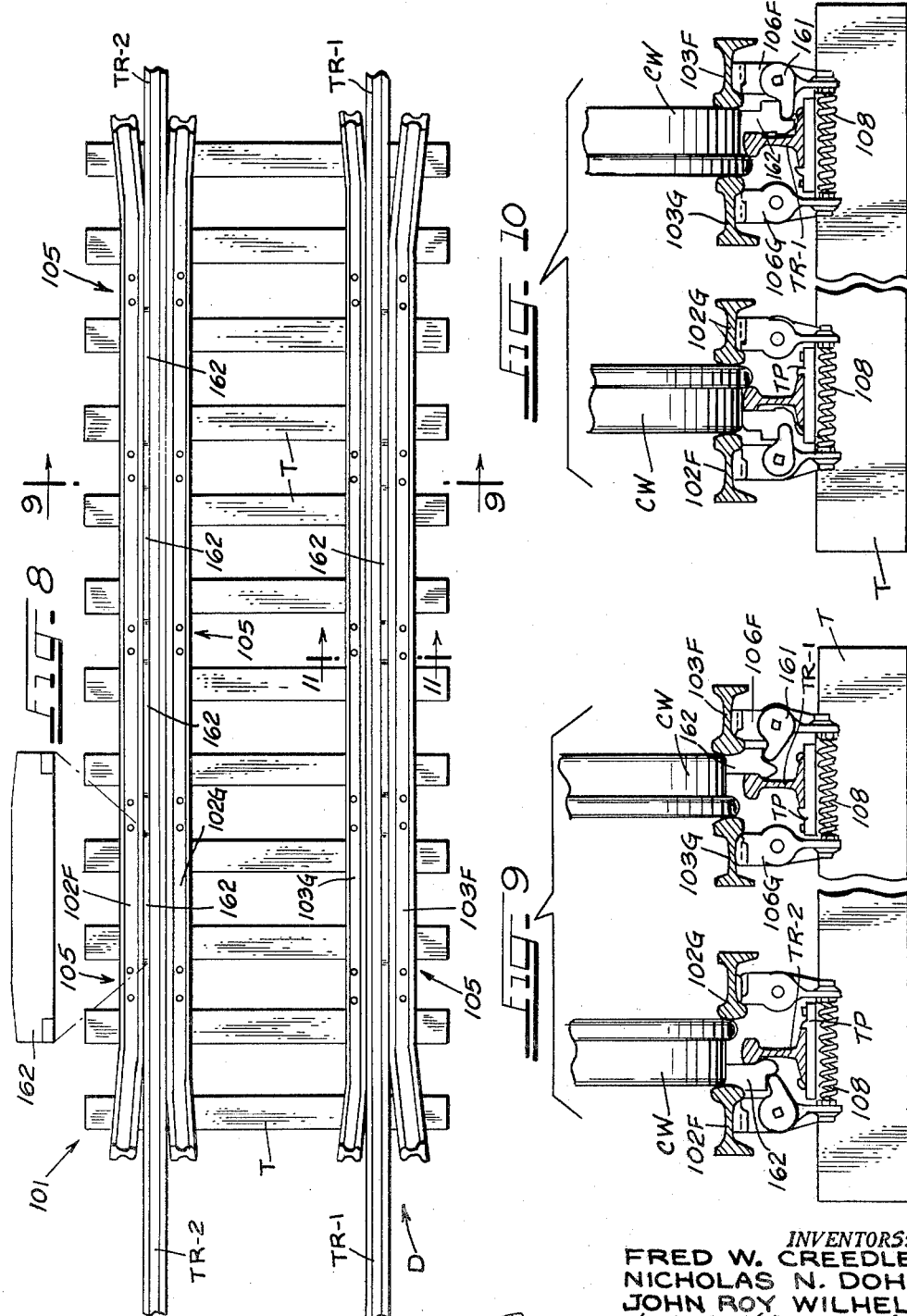

March 17, 1964 F. W. CREEDLE ETAL 3,125,185
RAILROAD CAR RETARDERS
Filed July 8, 1960 7 Sheets-Sheet 5
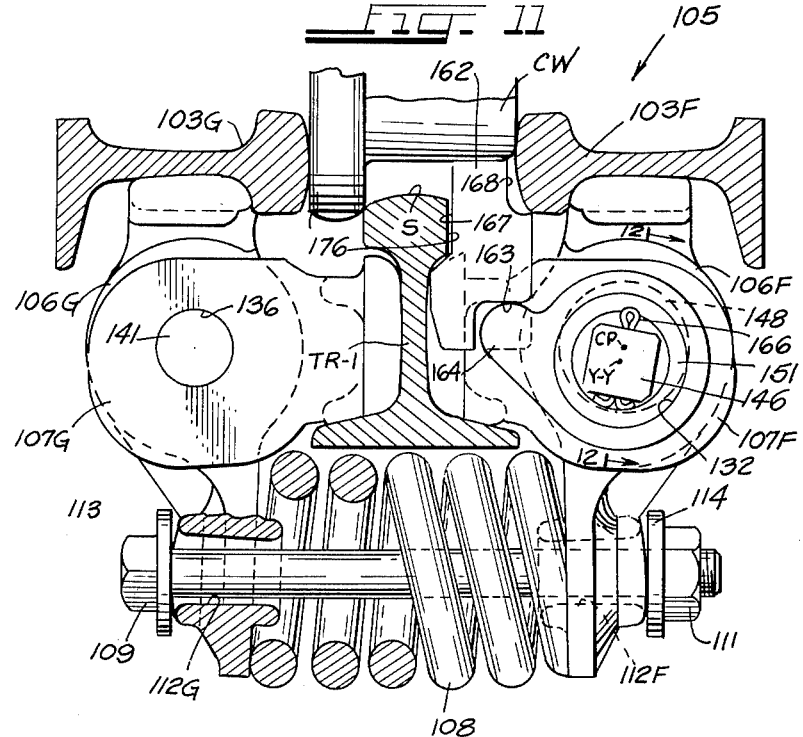
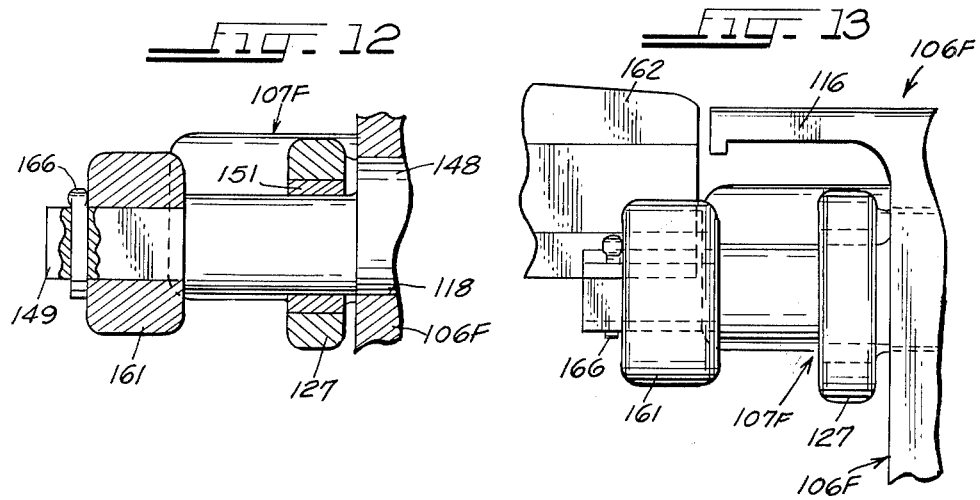
INVENTORS:
FRED W. CREEDLE
NICHOLAS N. DOHRN
JOHN ROY WILHELM March 17, 1964 F. W. CREEDLE ETAL 3,125,185
RAILROAD CAR RETARDERS
Filed July 8, 1960 7 Sheets-Sheet 6

INVENTORS:
FRED W. CREEDLE
NICHOLAS N. DOHRN
JOHN ROY WILHELM
By Wallace, Kinzer & Dorn
Attys.

March 17, 1964 F. W. CREEDLE ETAL 3,125,185
RAILROAD CAR RETARDERS
Filed July 8, 1960 7 Sheets-Sheet 7
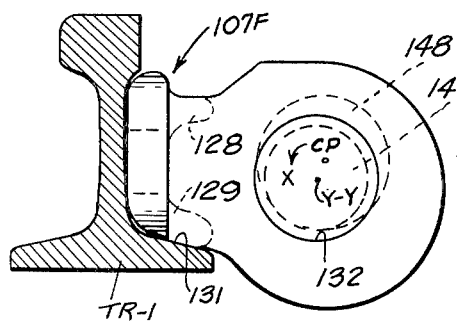
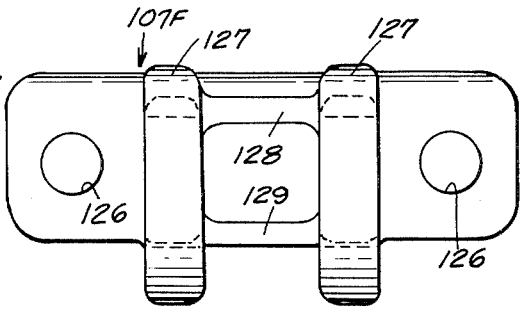
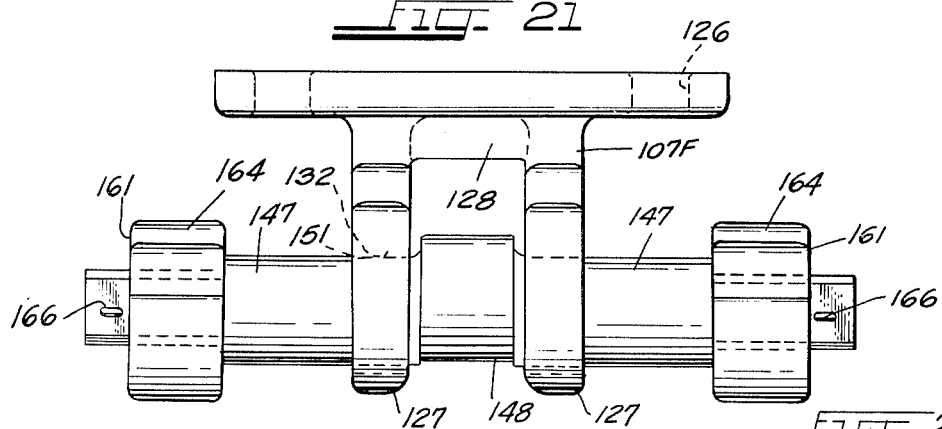
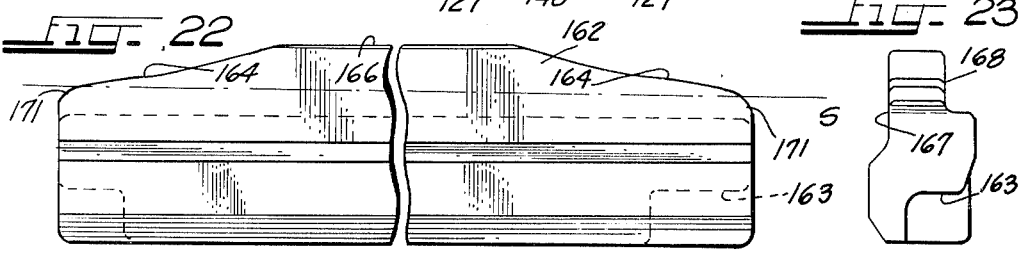
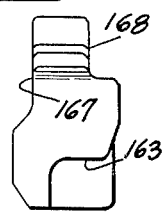
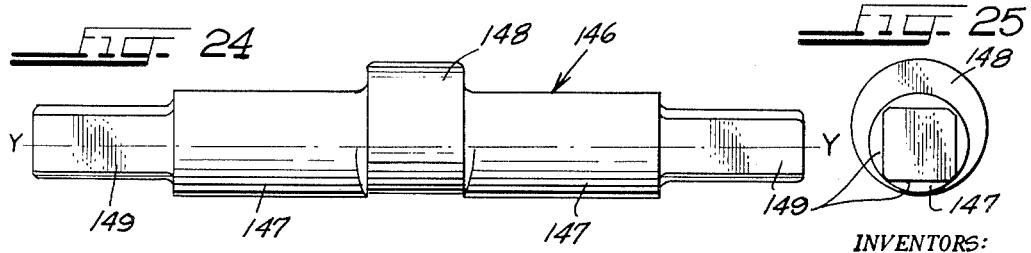
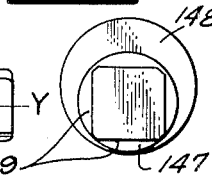
INVENTORS:
FRED W. CREEDLE
NICHOLAS N. DOHRN
JOHN ROY WILHELM
By Wallace, Kinzer & Dorn
ATTYS.

United States Patent Office 3,125,185
Patented Mar. 17, 1964

3,125,185
RAILROAD CAR RETARDERS
Fred W. Creedle, Park Ridge, and Nicholas N. Dohrn and John R. Wilhelm, Chicago, Ill., assignors to American Brake Shoe Company, New York, N.Y., a corporation of Delaware
Filed July 8, 1960, Ser. No. 41,613
5 Claims. (Cl. 188—62)

This invention relates to a railroad car retarder device of the general kind which is effective to frictionally engage the opposite faces of a railroad car wheel to thereby exert a decelerating force on the railroad car.

This application is a continuation-in-part of application Serial No. 858,770, filed December 10, 1959, now abandoned.

Retarder devices of the general kind to which this invention relates include a pair of guard members which are mounted so as to extend along a portion of the length of each of the traffic rails of a railroad track and are mounted for movement toward and away from each other in a manner such that the normal spacing between the guard members of the retarder is less than that of the width of a car wheel. Thus, a car wheel upon entering the retarder moves the guard members away from one another, and a biasing spring or like arrangement is effective to force the guard members into frictional engagement with the sides of the car wheel.

A car retarder of the kind to which this invention relates is especially useful in railroad freight car classification systems wherein railroad cars are shuttled one by one or in multiples down a lead track to various classifying branch tracks. In such classification systems it has often been the general practice to locate a master retarder at a fixed position along the lead track so that each car is initially retarded by such a master retarder. Such a master retarder has generally been of a relatively complex construction so as to enable a variable retarding force to be applied to a railroad car passing therethrough, either under manual control of an operator or under automatic control of associated car weighing and speed measuring apparatus. Also in accordance with conventional practice manually positionable skates are often utilized in the classifying branch tracks to further aid in stopping the cars at desired positions along these tracks. Once a string of cars has been positioned along a particular branch track, the skate or similar devices must be manually removed prior to moving the cars so classified from the branch track.

Because of the labor and attention thus necessitated by the skate or similar devices, permanently installed and automatically operating retarder devices in each branch track offer significant advantages. However, retarder devices heretofore known have often been relatively complex and expensive structures such as to make these devices undesirable for use on the branch tracks. Also, the retarder devices heretofore known have presented problems in operation, notably creeping of the retarder along the track and derailment of the car passing through the retarder. In this regard it will be appreciated that the momentum of the car upon entering a retarding device imparts a force to the guard members, and thus the entire retarder arrangement tends to shift longitudinally along the traffic rail in the direction of the moving car with repeated applications of such forces.

Moreover, it also sometimes happens, due to a lightly loaded wheel or other reason, that the biasing force exerted on the guard members acts to pinch the car wheel out of the car retarding device. It has heretofore been proposed to include auxiliary guard structure or the like as a part of a retarder device to prevent derailment of a railroad car as a result of such pinching action, but even so a critical condition arises at the end of the retarder device when the car wheel must return to the traffic rail. To prevent possible derailment at this point of the operation, the car retarder devices heretofore known have required auxiliary anti-derailing apparatus of heavy and bulky construction for insuring that the car wheel is properly returned to the traffic rail.

It is a primary object of this invention to construct a car retarder with a minimum of operative parts and which is effective to function in a novel manner to prevent both creeping of the retarder device and dangers of derailment.

One form of a car retarder constructed in accordance with this invention embodies a pair of support members which are bolted directly to the opposite sides of the web section of a traffic rail. Each of the support members includes a pair of projecting lugs, and a central portion of one of a pair of lever arms is pivotally mounted between such lugs. The lever arms so mounted extend generally vertically alongside the traffic rail and mount guard members on the upper ends thereof. Biasing means, which may preferably include a compression spring, are disposed between the lower ends of the lever arms and are effective to force the guard members into frictional engagement with the opposite faces of a car wheel passing through the retarder device. The manner in which the support members are bolted to the traffic rail as well as the manner in which the projecting lugs contain the lever arms enables the retarder device of this invention to be retained at a fixed position and effectively resist any tendency to creep longitudinally along the traffic rail. The guard members are so mounted relative to the traffic rail that the biasing means are effective to maintain one of the guard members in guarding relation with the flange portion of a car wheel and move the other guard member to a position wherein that guard member affords a support for the tread portion of a car wheel in the event that a lightly loaded car wheel should be pinched out of the retarder in the manner noted hereinabove. Additionally, the end portions of the car retarder constructed in accordance with this invention are flared outwardly in a manner such that the tread portion of the car wheel drops back onto the traffic rail while a guard member continuously guards the wheel flange to thereby prevent any possibility of derailment. It is another object of this invention to incorporate the foregoing structural features in a novel car retarder.

It is another object of this invention to apply a retarding force that varies with the load carried by a car wheel. It is a related object to incorporate in a car retarder which embodies the structural features enumerated above a quite simplified mechanism which is effective to achieve such a result.

While weight-sensing or car wheel weight-responsive apparatus have heretofore been incorporated with car retarder structure, the weight-responsive arrangements of the prior art have most generally required a floating running rail or traffic rail as an essential element of the design. Thus, by detecting the deflection of a floating running rail with such prior art apparatus the car weight is determined so that a corresponding retarder force can be applied to the car wheel. This floating running rail construction has presented problems in the course of operation which have mitigated against general adoption of such weight-sensing apparatus. Thus, it has been found that ice, snow, ballast and the like frequently become packed underneath the running rail in amounts sufficient to interfere with proper operation of the weight-sensing apparatus. It is accordingly another object of the present invention to associate simplified mechanism as noted hereinabove in a car retarder in a manner such that the weight-compensating mechanism of the present invention is operative with a running or traffic rail that is fixedly supported.

Briefly summarized, such mechanism comprises a bar member which is positioned to be engaged by the under side of the tread portion of a car wheel. The bar member normally projects upwardly some distance above the upper surface of the traffic rail. A car wheel gripped between the guard members of the car retarder contacts the bar member and depresses the bar member an amount which is dependent upon the load carried by the car wheel. Such movement of the bar member produces rotation of a crank arm which in turn effects shifting of the pivot structure of one of the lever arms in an inward direction toward the traffic rail. As a result of such shifting of the pivot structure of the lever arm, the spring disposed between the lower end portions of a pair of lever arms, as noted hereinabove, is progressively compressed and thereby caused to exert a greater biasing force on the lever arms. Consequently, the guard members exert an increased retarding force on the car wheel; and to incorporate the foregoing features in a novel and inexpensive car retarder is another object of the present invention.

Still a further object of the present invention is to enable the gripping force to be progressively increased along the length of a car retarder of the general kind described. In this manner only a relatively small retarding force may be exerted on the car wheel at the inlet end of the retarder to thereby facilitate and insure entry of the car wheel within the car retarder. Subsequently, and as the car wheel moves longitudinally through the car retarder, a greater gripping retarding force may be exerted thereon. Such a mode of operation is achieved under the present invention by supporting the longitudinally extending guard members by spring and lever arm assemblies at a plurality of spaced locations along the longitudinal extent of the car retarder, and also by providing for individual adjustment of the biasing force exerted by each individual spring assembly.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a plan view of a portion of a railroad track with one form of a car retarder constructed in accordance with this invention mounted thereon;

FIG. 2 is a schematic elevation view, taken substantially along the line indicated by the arrows 2—2 in FIG. 1, showing the relative dispositions of a car wheel, traffic rail, and guard members of the form of the car retarder illustrated in FIG. 1 whenever a car wheel is gripped between the guard members of the retarder;

FIG. 3 is a schematic elevation view, also taken substantially along the line indicated by the arrows 2—2 in FIG. 1, showing the relative dispositions of a car wheel, traffic rail, and guard members of the form of the car retarder illustrated in FIG. 1 with the car wheel pinched out of the car retarder;

FIG. 4 is a side elevation view of a lever arm assembly portion of the car retarder illustrated in FIG. 1;

FIG. 7 is a detail view of a shim utilized in the lever arm assembly;

FIG. 8 is a plan view of a portion of a railroad track with a weight-compensating form of a car retarder constructed in accordance with the present invention mounted thereon;

FIG. 9 is a schematic elevation view, taken substantially along the line indicated by the arrows 9—9 in FIG. 8, showing the relative dispositions of a car wheel and various parts of the form of the car retarder illustrated in FIG. 8 with a lightly loaded car wheel gripped between the guard members;

FIG. 10 is a schematic elevation view, also taken substantially along the line indicated by the arrows 9—9 in FIG. 8, and showing the relative dispositions of a car wheel and various parts of the form of the car retarder illustrated in FIG. 8 with a heavily loaded car wheel gripped between the guard members;

FIG. 11 is an elevation view, partly in section, taken substantially along the line indicated by the arrows 11—11 in FIG. 8;

FIG. 12 is a fragmentary detail view taken substantially along the line indicated by the arrows 12—12 in FIG. 11;

FIG. 13 is a fragmentary side elevation view of a part of the car retarder assembly illustrated in FIG. 11 but with the guard member and the traffic rail omitted for clarity of illustration.

FIG. 19 is an end elevation view of a support member incorporated in the form of the car retarder illustrated in FIGS. 8 and 11;

FIG. 20 is a side elevation view of the support member illustrated in FIG. 19;

FIG. 21 is a top plan view of the support member illustrated in FIG. 20 and showing a pivot shaft and a pair of crank arms associated therewith;

FIG. 22 is a side elevation view of a ramp bar incorporated in the form of the car retarder illustrated in FIGS. 8 and 11;

FIG. 23 is an end elevation view of the ramp bar illustrated in FIG. 22;

FIG. 24 is a side elevation view of a pivot shaft incorporated in the form of the car retarder illustrated in FIGS. 8 and 11; and FIG. 25 is an end elevation view of the pivot shaft illustrated in FIG. 24.

Figure 5:
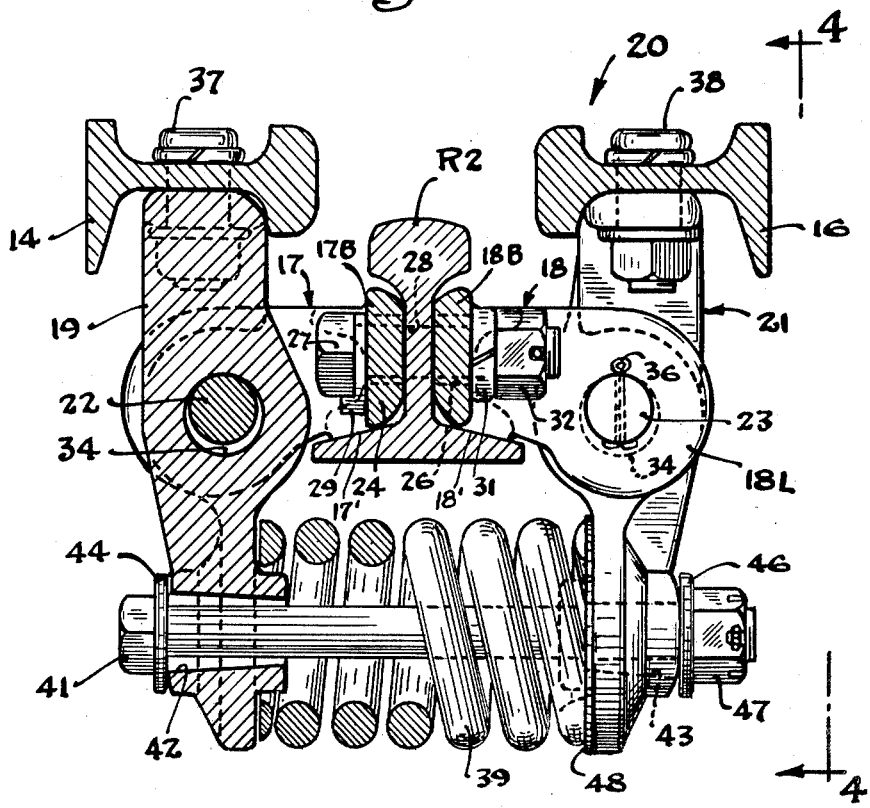
FIG. 5 is an end elevation view, partly in section, of the assembly illustrated in FIG. 4 and is taken substantially along the line indicated by the arrows 5—5 in FIG. 1.

In FIG. 1 one form of a car retarder constructed in accordance with this invention is indicated generally by the reference numeral 11. The retarder 11 is adapted to be mounted directly on both traffic rails R1 and R2 of a railroad track which includes crossties 10. The car retarder 11 includes two pairs of guard members which are mounted so as to extend along a significant portion of the length of the traffic rails R1 and R2. Thus, guard members 12 and 13 are disposed on opposite sides of the rail R1, while guard members 14 and 16 are disposed on opposite sides of the rail R2. In the positions illustrated in FIG. 1 the guard members 13 and 14 lie on the gage side of the traffic rails, while the guard members 12 and 16 lie on the field sides of the rails. Each pair of guard members is of the same construction and is supported at spaced intervals by lever arm assemblies 20.

With particular references now to FIGS. 4 and 5, it is seen that a lever arm assembly 20 comprises a pair of support members 17 and 18, a pair of lever arms 19 and 21 and pin means in the form of pins 22 and 23 which enable the guard members, here indicated as 14 and 16, to be moved toward and away from one another by pivoting movement of the lever arms about the pins.

The support members 17 and 18 each include generally rectangular-shaped base portions 17B and 18B which are of substantially the same height as the web section of the traffic rail R2. The base portions 17B and 18B are each formed with openings 24 and 26 respectively at the opposite ends thereof for receiving the shank of a bolt 27 therein. The shanks of the bolts 27 are also passed through apertures 28 formed in the web portions of the traffic rail R2 and thus mount the car retarder at a fixed position on the traffic rail. Preferably, and as illustrated in FIG. 5, a head lock 29 is interposed between the head of the bolt 27 and the base 17B, while a lock washer 31 is interposed between the base portion 18B and the tightening nut 32.

The support members 17 and 18 are each additionally formed with a pair of spaced-apart projecting lugs 18L, respectively. The spacing between these lugs is only slightly greater than the width of the lever arms 19 and 21 which are disposed therebetween. Aligned openings 33 are formed in each of the lugs for receiving the pins 22 and 23. The relative diameters of the openings 33 and the pins 22 and 23 is such that the pins are retained within the openings with little opportunity for free play therein.

However, the lever arms 19 and 21 are formed with over size openings 34 which enable some amount of rotation of the lever arms about their longitudinal axes in the directions indicated by the arrows Y—Y (see FIG. 4) for a purpose presently to be described. The pins 22 and 23 are retained in position as by cotter keys 36.

It will be noted that the lower edges of the support members 17 and 18 at the portions 17′ and 18′ where the projecting lugs join with the base portions are tapered complementary to the upper surfaces of the flanges of the traffic rail so that the weight of the car retarder is distributed along the width of this flange. The support members 17 and 18 are preferably formed as unitary members as by a casting operation.

As viewed in FIG. 5 the lever arms 19 and 21 extend generally vertically alongside the traffic rail R2 in a manner such that the upper ends of the arms extend slightly above the top of the traffic rail, while the lower ends of the arms depend beneath the base of the traffic rail. Each of the lever arms is generally of a T-shaped configuration as viewed in side elevation in FIG. 4 and includes outwardly extending flanges which form the bar of the T. The guard members 14 and 16, shown as track rails, are mounted on the upper ends of the lever arms 19 and 21 by bolts 37 and 38, respectively, which clamp the guard members to the flanged portions of the lever arms. Thus, as viewed in FIG. 5, the bolts 37 and 38 have shank portions which are passed through apertures formed in the web portions of the rails forming the guard members so as to position the guard rails horizontally and with the head portions facing one another. Although various structures may be utilized as the guard element, such rails are particularly well adapted for use as guard members inasmuch as the head portions of the rails afford an effective support surface for the tread of a car wheel in a manner presently to be described. Whenever rails are so utilized as the guard members, it is necessary that the upwardly projecting flange of the base be ground-off as illustrated to prevent any interference with the wheel or axle structure of a railroad car passing through the retarder.

The lower end portions of the lever arms 19 and 21 incorporated a generally circular configuration, as viewed in the side elevation in FIG. 4. This circular configuration, in conjunction with a flat planar surface on the facing sides of each lever arm, affords a spring seat for a coiled compression spring 39 which acts as a biasing means for exerting a force on the lever arms tending to move the guard members toward one another. The extent of this movement is limited by a connecting bolt 41 whose shank is passed through tapered openings 42 and 43 in the lower ends of the respective lever arms 19 and 21. Thus, the spring 39 biases the lower ends of the lever arms 19 and 21 apart and into engagement with washers 44 and 46 disposed on the bolt beneath the head of the bolt at one end and the tightening nut 47 at the opposite end. This is the at-rest position of the retarder, as illustrated in FIG. 5, in which there is no car wheel within the car retarder. In this position of the car retarder the spacing between the guard members 14 and 16 is somewhat less than that of the width of the narrowest car wheel that is to be engaged by the guard members. Thus, a car wheel upon entering the retarder must move the guard members outwardly from each other by pivoting the lever arms 19 and 21 about the respective pivot pins 22 and 23. Such movement of the lever arms causes a predetermined compression of the spring 39 which therefore exerts a predetermined retarding force through the lever arms.

It is a feature of this invention that the force exerted by the spring 39 can be readily adjusted. Thus, one or more shims 48 are interposed between an end of the spring 39 and a corresponding inner face of a lever arm. As illustrated in FIG. 7, these shims are of an arcuate construction so as to have a slotted opening 49 enabling the shims to be slipped over the shank of the bolt 41. By varying the number of the shims, and thus the precompression of the spring 39, the force exerted by the guard members on the side faces of the car wheel can be pre-determined for any width of the wheel. Such shims thus not only simplify initial fabrication by eliminating any need for precision grinding of the faces of the lever arm but also enable the force exerted by the compression spring to be readjusted at any time to compensate for wearing down of the guard members during operation of the car retarder.

It may be noted that the point of pivot of each lever arm is approximately midway between the spring 39 and the guard member. Thus, the force applied by the guard member is proportionate to the force exerted by the spring, and as noted hereinabove, such force can be varied by insertion or removal of shims 48.

With particular reference now to FIG. 1, it is seen that the end portions of each of the guard members are flared away from the traffic rail and from one another. Also, and as illustrated in FIG. 1, the guard members on the field sides of the traffic rails have a flared end portion of greater length which is flared away from the traffic rail at a greater angle and to a greater total extent than the guard members on the gage side of the rail. Thus, in the commercial form of the invention the gage side guard member is flared 2½″ in 26″ (equivalent to 1″ in 10.4″) while the field side guard member is flared 1½″ in 18″, which is equivalent to 1″ in 12″. This arrangement of the end portions of the car retarder 11 enables the car retarder to guide the car wheel back onto the traffic rail in the event that the car wheel should be pinched out of the retarder. The manner in which this flared construction affords this guiding action effectively obviates any possibility of the car becoming derailed at the critical period at the end of the car retarder when the car wheel must be returned to the traffic rail to avoid derailment. The manner in which the car retarder of this invention operates to afford this anti-derailing function will now be described in conjunction with a summary of the overall operation of the apparatus described hereinabove.

Figure 6:
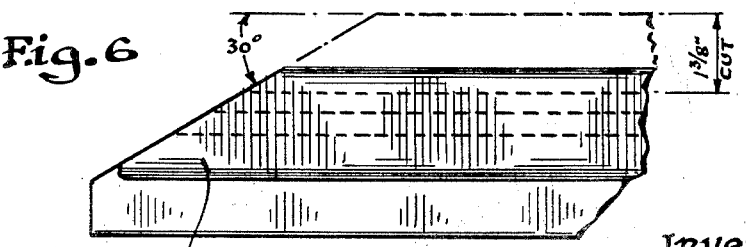
FIG. 6 is a schematic detail view of an end of a guard member.

Assuming that a railroad car is moving along the traffic rails R1 and R2 in the direction indicated by the arrow "X" in FIG. 1, the car wheels freely pass between the extremities of the guard members 12—13 and 14—16 and into the space between the flared-end portions of the respective guard members. To assure free entry of the car wheel into the retarder, the end portions of each guard member may be beveled in the manner indicated in FIG. 6. Inasmuch as the normal space between the guard members is less than the width of a car wheel, the car wheel acts as a wedge to spread apart the guard members associated with each traffic wheel, and this causes a thrust to be developed in the car retarder structure which would tend to shift the car retarder longitudinally along the traffic rails in the direction of movement of the railroad car. However, the manner in which the support pieces 17 and 18 are bolted directly onto the traffic rail effectively prevents such creeping of the car retarder structure, and the projecting lugs of the support pieces afford sufficient support for the lever arms for preventing any deformation of the car retarder structure.

Since the guard members are progressively spread apart by the entry of a car wheel, some rotational movement of the lever arms about their respective longitudinal axes must be permitted. This necessary limited amount of rotation of the lever arms is accomplished by virtue of the oversize openings 34 in the lever arms. By reason of such oversize openings each lever arm may be rotated a slight amount by the action of the car wheel on the respective guard members without causing an excessive stress level to be developed in the pins 22 and 23. Although the pin-receiving openings 34 are somewhat larger than the diameter of the pins 22 and 23, the lever arms are nevertheless effectively supported for pivoting action about these pins.

With reference now to FIG. 2, the relative disposition of certain component parts of the car retarder of this invention are illustrated in the positions assumed whenever a car wheel is effectively gripped between the opposed guard members. Thus, car wheels CW in passing through the retarder 11 normally roll along the traffic rails R1 and R2 with the tread T of the car wheels supported by the upper surface of the traffic rail and the flanges F guided by the gage sides of the traffic rails. In this position of the car wheels the biasing springs of the lever arm assemblies are effective to maintain the guard members 12—13 and 14—16 in frictional engagement with the side faces of the car wheels with a predetermined magnitude of force as described hereinabove. Thus, the car retarder is effective to exert a desired decelerating force on the car wheels of the railroad car.

As mentioned hereinabove, it is possible that, due to light loading of a car wheel or various other reasons, the car wheel may be pinched out of the car retarder. This presents the problem of derailment, not only at the instant that the car wheel is pinched out, but also, and most critically, at the moment when the car wheel must be returned to the traffic wheel at the end of the retarder. In accordance with this invention, and as illustrated in FIG. 3, a part of the car retarder structure is effective to maintain a continuous guarding of the car wheel flange F throughout the length of the retarder in the event that the car wheel should be pinched out of the car retarder. Additionally, and quite importantly, the biasing means in the form of the springs 39 are effective to move the guard member on the field side of the traffic rail to a position wherein the wheel tread is supported on the guard member with no portion of the weight of the car being transmitted through the wheel flange. This operative relationship of the guard members and the car wheel is illustrated in FIG. 3, wherein the field side guard members 12 and 16 have been biased inwardly toward the traffic rails R1 and R2 to a position wherein the wheel treads T are supported thereon. Also, as illustrated in FIG. 3, the wheel flanges F are well guarded by the gage side guard members 13 and 14.

Assuming still that the car wheels are moving in the direction indicated by the arrow X in FIG. 1, and assuming that the car wheels should have become pinched out of the retarders to the positions illustrated in FIG. 3, the car retarder of this invention is effective to return the wheel treads T from the top of the guard members 12 and 16 to the traffic rails R1 and R2 at the exit end of the car retarder 11, while the gage side guard members 13 and 14 maintain a continuous guarding action of the wheel flanges F. This anti-derailing function of the car retarder is accomplished by the flared end construction of the car retarder. Thus, the field side guard members, which are flared away from the traffic rails to a greater extent than the gauge side guard members, enable the wheel treads T to drop back onto the traffic rails R1 and R2, while the wheel flanges F are continuously guarded by the guard members 13 and 14.

Although the operation of the car retarder has been described with the assumption that the car wheels were traveling in the direction of the arrow X in FIG. 1, the construction of the flared end portion of the guard members of the car retarder 11 is the same at both ends of the car retarder so that the car retarder is equally well adapted for use with cars traveling in the opposite direction.

In many instances it is desirable that a greater retarding force be applied to a heavily loaded car than is applied to a lightly loaded or empty car. In accordance with the present invention a car retarder which incorporates the structural features described in detail hereinabove and illustrated in FIGS. 1–7 of the drawings can be constructed to provide a retarding force which varies with the load carried by a car wheel passing through the retarder. Moreover, such a result is achieved by an inexpensive mechanism and which does not interfere with the other functions of the car retarder, such as the anti-derailing function described in detail hereinabove.

In FIG. 8 a car retarder constructed in accordance with another form of the present invention and effective to afford automatic compensation for the weight of a railroad car is illustrated in plan view and indicated generally by the reference numeral 101. The car retarder 101 is shown positioned on a portion of railroad track which includes traffic rails TR–1 and TR–2. The traffic rails are in turn mounted on cross-ties T in a conventional manner as by spikes and tie plates TP (see FIGS. 9 and 10). The retarder 101 comprises two pairs of guard members which extend longitudinally along a part of the traffic rails TR–1 and TR–2. Thus, guard members 102F and 102G extend along the traffic rail TR–2 on the respective field and gage sides thereof while guard members 103F and 103G extend along the traffic rail TR–1. The guard members are adapted to frictionally grip a car wheel therebetween to exert a retarding force on the car wheel in substantially the same manner as in the form of the invention illustrated in FIGS. 1–7 hereinabove. However, in the form of the invention illustrated in FIG. 8 the retarding force exerted by the respective pairs of guard members 102F and 103F and 102G and 103G varies with the load carried by a car wheel gripped between such guard members as will become more apparent from the description to follow. Also, and as in the form of the present invention illustrated in FIG. 1, the pairs of guard members 102F and 103F and 102G and 103G are directly mounted and supported on the traffic rails by a plurality of spring and lever arm assemblies indicated generally by the reference numerals 105. Also, the end portions of the guard members are flared outwardly away from the respective traffic rails in the manner illustrated in FIG. 8 to achieve the anti-derailing function described hereinabove with reference to the flared end construction of the guard members of the car retarder illustrated in FIG. 1.

With reference now to FIG. 11 a spring and lever arm assembly 105 is illustrated in end elevation. In FIG. 11 it is seen that the guard members 103F and 103G are mounted on the upper ends of respective lever arms 106F and 106G. The lever arms extend generally vertically alongside the traffic rail TR–1 and are in turn mounted for pivoting action at portions intermediate the ends thereof by support members or hanger castings 107F and 107G. The support members 107 are bolted to the web section of the traffic rail TR–1 in a manner which will be described in greater detail hereinbelow. Thus, the lower end portions of the lever arms depend beneath the traffic rail TR–1 and biasing means, which include a coil spring 108, are interposed between the lower end portions of the lever arms for biasing the upper ends of the lever arms and the guard members 103F and 103G toward one another. A tie bolt 109 is passed through openings 112G and 112F in the lower ends of the respective lever arms 106G and 106F, and the bolt and nut 111 serve to limit the extent to which the coil spring 108 can bias the guard members 103 toward one another. Preferably, the openings 112F and 112G are slightly flared as illustrated to prevent binding of the lever arms on the shank of the bolt during the operation of the car retarder. Washers 113 and 114 are interposed between the lever arms and the respective head of the bolt 109 and nut 111. Also, shims, such as the shim 48 illustrated in FIG. 7, may be interposed between ends of the coil spring 108 and the inner faces of the lever arms to enable an initial desired biasing force of the coil spring 108 to be obtained.

The guard members may preferably comprise lengths of rail disposed sidewise as illustrated in FIG. 11 so as to have the upper surfaces of the rail heads presented for frictional engagement with a car wheel as CW. In such a case, the upwardly projecting portions of the base flange of the rails forming the guard members are preferably cut off in the manner illustrated in FIG. 11.

Figure 14:
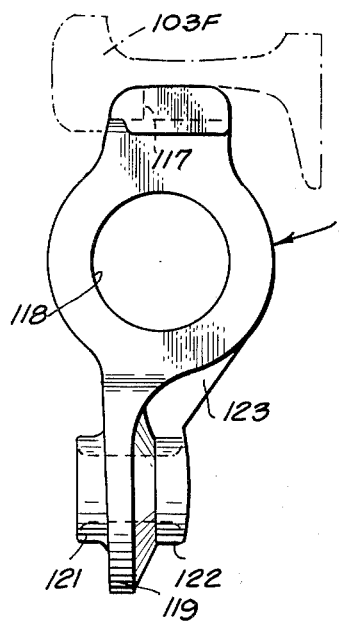
FIG. 14 is an end elevation view of a lever arm incorporated in the form of the car retarder illustrated in FIGS. 8 and 11.
Figure 15:
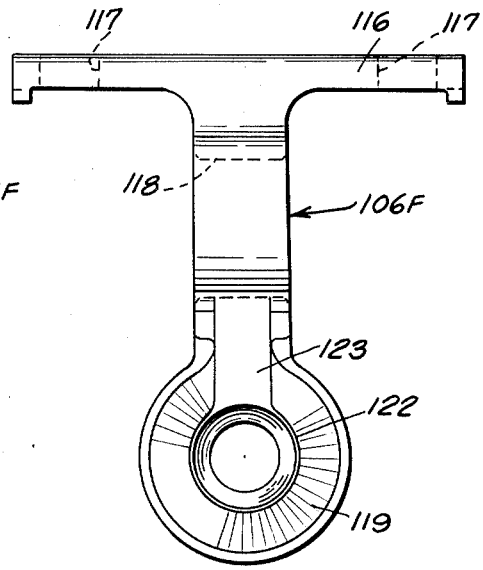
FIG. 15 is a side elevation view of the lever arm illustrated in FIG. 14.
Figure 16:
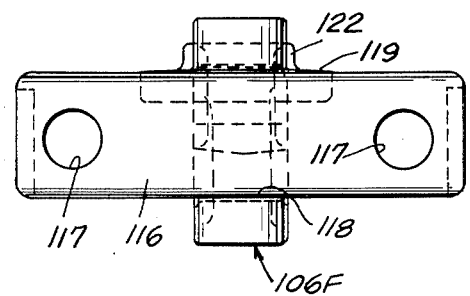
FIG. 16 is a top plan view of the lever arm illustrated in FIG. 15.

The lever arm 106F is shown separately in FIGS. 14–16. In these figures it is seen that the lever arm 106F presents a generally T-shaped configuration in side elevation (see FIG. 15), and includes a longitudinally extending upper bar or head 116 formed with vertical holes 117 adapted to receive a fastening bolt or the like for attaching the guard member 103F thereon. The stem of the T-shaped lever arm 106F comprises a flattened and generally circular-shaped central portion which is formed with a circular opening 118 adapted to receive pivot means therein, which pivot means will presently be described in detail. The lower end portion of the lever arm 106F comprises a generally circular-shaped flange 119 which is disposed transverse to the central disc portion of the lever arm. Circular bosses 121 and 122 project from opposite faces of the flange 119, and a reinforcing web 123 extends between the boss 122 and the central portion of the lever arm. Thus, the lever arm 106F comprises a light weight yet rigid member.

The opposed lever arm 106G is constructed like the lever arm 106F described in detail hereinabove with the exception that the lever arm 106G is formed with a circular opening adapted to receive a pivot pin 141 (see FIG. 11) of somewhat smaller diameter and centered slightly higher than the opening 118 of the lever arm 106F. The reason for such construction will become more apparent from the description to follow.

The support member or hanger casting 107F is shown in detail in FIGS. 19–21. With particular reference to FIG. 20 it is seen that the support member 107F includes a longitudinally extending base which is adapted to abut the field side of the traffic rail TR–1 and be affixed thereto by fastening bolts or the like passed through openings 126 formed in the base of the support member. The support member 107F also includes ears or lugs 127 which project perpendicularly from the base in spaced relation to one another. Reinforcing webs 128 and 129 extend between and join the lugs 127 in the portions adjacent the base of the support member 107F. As best illustrated in FIG. 19, the lower surfaces of the ears 127 and the reinforcing web 129 are adapted to reside on the upper surface of the base flange of the traffic rail TR–1 as indicated by the reference numeral 131. In this manner the greater portion of the weight of the car retarder and any portion of the load carried by a car wheel which may be exerted downwardly on the car retarder is directly supported on the base flange of the traffic rail so that the fastening means extended through the openings 126 and web of the traffic rail are not subjected to substantial shear loadings by downward forces exerted on the car retarder. As best illustrated in FIG. 19 each of the ears or lugs 127 is formed with a circular opening 132 which is adapted to support a pivot shaft for the lever arm 106F.

The support member 107G is similar in construction to the support member 107F described in detail hereinabove with the exception that once again the central opening 136 (see FIG. 11) for a pivot pin 141 which supports the lever arm 106G is somewhat smaller than and centered slightly higher than the openings 132 in the support member 107F.

In accordance with the present invention pivot means are incorporated in each of the spring and lever arm assemblies 105 for enabling the lever arms to be freely pivotal about a portion intermediate the ends thereof and which portion is disposed between the projecting lugs of the support members. Thus, as illustrated in FIG. 11 a pin 141 is supported at the ends thereof in the circular openings 136 formed in the ears of the support member 107G, and the pin 141 in turn supports the lever arm 106G for free swinging movement thereon. This construction is essentially the same as that described with reference to the pin 22 of the form of the car retarder illustrated in FIG. 5 and described hereinabove. Also, the opening in the lever arm through which the pin 142 is passed is preferably formed somewhat oversize with respect to the pin so that the lever arm 106G is permitted a slight amount of lateral rocking motion thereon.

In the form of the invention illustrated in FIGS. 8 and 11 the pivot means for the lever arm 107F is constructed somewhat differently than the pivot structure for the corresponding lever arm of the form of the car retarder illustrated in FIG. 5. More particularly, the pivot for the lever arm 106F is adapted to be shifted inwardly toward the traffic rail TR–1 by an amount which is dependent upon the load carried by car wheel CW, and the effect of such shifting of the pivot means for the lever arm 106F is to cause a greater compression of the coil spring 108 to be produced, which in turn energizes the guard members 103F and 103G to engage the car wheel CW with greater force.

This manner of shifting the pivot means for the lever arm 106F is obtained by a rotatable shaft 146 which incorporates an eccentric construction in the portion engageable with the lever arm 106F. The shaft 146 is shown separate from the rest of the car retarder structure in FIGS. 24 and 25. In these figures it is seen that the shaft 146 includes mounting portions 147 which are adapted to support the shaft 146 and lever arm 106F from the lugs 127. A pivot portion 148 of enlarged diameter and eccentrically disposed with respect to the mounting portions 147 is adapted to be received within the circular opening 118 of the lever arm 106F to support the lever arm for free swinging movement thereon. The end portions of the shaft 146 are formed to a generally square configuration as illustrated to afford flats as 149.

In FIG. 21 the pivot or support shaft 146 is shown in its assembled position with respect to the support member 107F but without the lever arm 106F normally carried on the pivot portion 148 of the shaft. To assemble the pivot shaft 146 and lever arm 106F in position within the support member 107F, the lever arm 106F is initially positioned between the lugs or ears 127. Subsequently, the enlarged pivot portion 148 is passed through an opening 132 in one of the lugs or ears 127 and slipped into place within the opening 118 of the lever arm 106F. It will be recognized that the mounting portions 147 of the shaft 146 are of somewhat smaller diameter than the openings 132 in the ears or lugs 127, which latter openings must be large enough to enable the pivot portion 148 of the shaft 146 to be passed therethrough. Accordingly, sleeves or bushings 151, as best shown in FIG. 12, are thereafter slipped over the ends of the shaft 146 and positioned within the openings 132 to take up the resulting slack between the openings and the mounting portions 147 of the shaft. Such sleeves need not be of the exact axial length illustrated in FIG. 12 but may instead extend axially along the mounting portions 147 of the shaft 146 so as to be engageable with crank arms 161 to limit axial movement of such sleeves.

In the assembled position of the shaft 146 within the support member 107F the eccentric pivot portion 148 of the shaft is initially disposed substantially in the position indicated by the phantom lines in FIG. 19. In this position it will be apparent that any counterclockwise rotation of the shaft 146 in the direction indicated by the arrow X in FIG. 19, and about the axis of rotation YY of the shaft, will be effective to shift the center of pivot CP of the eccentric pivot portion 148 and the lever arm 106F inwardly toward the traffic rail TR–1. With the guard members 103F and 103G engaged with a car wheel such shifting of the center pivot of the lever arm 106F will have the effect of compressing the spring 108 to cause the spring to exert a greater biasing force on the car retarder structure as noted hereinabove.

In accordance with the present invention means are incorporated in the car retarder for shifting the center of pivot CP of the lever arm 106F an amount which is dependent upon the load carried by the car wheel CW (see FIG. 11) gripped between the guard members of the car retarder. Such means comprise a crank arm 161 affixed to each end of the shaft lever arm 106F and the traffic rail TR–1. As illustrated in FIG. 8 a series of ramp bars 162 is disposed along each traffic rail with an individual ramp bar extending between adjacent spring and lever arm assemblies 105.

Figure 17:
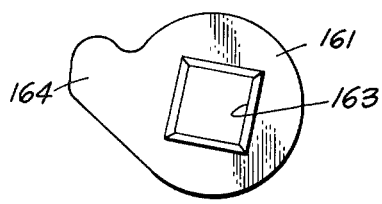
FIG. 17 is an end elevation view of a crank arm incorporated in the form of the car retarder illustrated in FIGS. 8 and 11.
Figure 18:
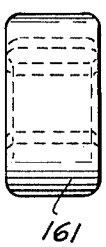
FIG. 18 is a side elevation view of the crank arm illustrated in FIG. 17.

With reference now to FIGS. 17 and 18 a crank arm 161 is shown separate from the other structure of the car retarder. The crank arm 161 is formed with a square-shaped opening 163 which is complementary to the square-shaped end portions of the shaft 146. Thus, in the assembled position of the crank arms on the ends of the shafts the square-shaped openings 163 engage the flats 149 of the shaft to lock the shaft for rotation with the crank arms 161. Each crank arm 161 also includes a projecting lug 164 which is adapted to engage a complementary recess in an underside of the end portions of a ramp bar 162. As illustrated in FIGS. 11 and 21, the crank arms 161 may be secured in position on the shaft 146 as by cotter pins 166.

A ramp bar 162 is shown separately in FIGS. 22 and 23 wherein it is seen that each ramp bar is an elongated member adapted to extend between the longitudinally spaced spring and lever arm assemblies 105 (see FIG. 8). The end portions of the underside of the ramp bar 162 are formed with recesses 163 adapted to receive the lugs 164 of the crank arms 161. The upper portion of the ramp bar 162 is formed with inclined upper surfaces 164 interconnected by a generally planar and horizontally extending surface 166 in the central portion of the ramp bar. This construction enables the ramp bar to present an upper surface which is for the most part normally disposed some distance above the upper surface of the traffic rail TR–1 but which also preferably includes a clearance incline 171 extending beneath the upper surface of the traffic rail for a purpose which will become more apparent from the description to follow.

With particular reference to FIGS. 11 and 23, it is seen that a portion of the inner face of each ramp bar 162 is recessed at 167 in the part of the ramp bar which is aligned with the rail head of the traffic rail. Also, the upper side of the outer face of the ramp bar 162 is recessed at 168 by an amount which is sufficient to permit the maximum inward movement of the guard member 103F.

Each ramp bar 162 is movable in a vertical direction in the car retarder of the present invention and is normally disposed substantially in the position illustrated in FIG. 11 in the at-rest position of the car retarder, in which position no car wheel is disposed within the car retarder.

In this position the greater portion of the ramp bar 162 projects upwardly above the upper surface S of the traffic rail TR–1 in the manner illustrated in FIGS. 11 and 22. However, a portion of the upper surface of the ramp bar, indicated by the reference numeral 171, is disposed below the upper surface S of the traffic rail to afford a clearance incline. In this position of the ramp bar 162 the center of pivot CP for the lever arm 106F is disposed at its maximum distance from both the traffic rail TR–1 and the center of pivot of the lever arm 106G, which is the axis of rotation of the pin 141.

It will be noted that the side of the head portion of the traffic rail TR–1 adjacent the ramp bar 162 is partially cut away as indicated by the reference numeral 176 to enable a compact arrangement of parts to be obtained.

The mode of operation of the car retarder 101 and the manner in which the car retarder exerts a retarding force which varies with the load carried by the car wheel to thereby afford automatic compensation for cars of varying weight and loading will be best understood by having reference to FIGS. 8–11. The car wheels of a railroad car may be assumed, for purposes of description, to enter the retarder in the direction indicated by the arrow D in FIG. 8. The car wheels are permitted free entry between the flared ends of the pairs of guard members 102 and 103 and are subsequently gripped between the guard members. In moving through the car retarder 101 the tread portion of each car wheel comes into engagement with a ramp bar 162. Inasmuch as the end portions of the ramp bars are formed with inclined upper surfaces 164 which terminate in clearance inclines 171 extending beneath the upper surfaces of the traffic rails, a jolting impact of a car wheel on a ramp bar is avoided. If the railroad car passing through the car retarder is empty or only slightly loaded, the car wheels effect little or no downward movement of the ramp bars 162, and this is the condition illustrated in FIG. 9. In such a case little or no shifting of the pivot structure for the lever arms of the spring assemblies 105 is obtained and the retarding force exerted by the guard members of the car retarder 101 is substantially that produced by the biasing force of the springs resulting from the initial wedging apart of the guard members by the entry of a car wheel therebetween.

However, if a heavily loaded car should enter the car retarder 101 the car wheels CW in engaging the ramp bars 162 cause the ramp bars to move downwardly by an amount related to the load carried by the car wheel. Thus, a heavily loaded car may cause the ramp bars 162 to be depressed to the position illustrated in FIG. 10. Such downward movement of the ramp bars 162 effects a corresponding rotation of the crank arms 161 which in turn rotate the eccentric shafts such as the shaft 146 to shift the center of pivots of the eccentric pivot portions as 148. Consequently, the lever arms carried thereon are shifted inwardly toward the traffic rails and toward the fixed points of pivot of the opposite lever arm in each pair of lever arms. Since the guard members are at all times engaged with the side surfaces of the car wheel CW, the upper ends of the lever arms in effect comprise fixed fulcrums so that the inward shifting of the pivot shafts as 146 cause the springs 108 to be compressed. As a result the biasing forces of the springs as 108 are increased which in turn causes the guard members to be engaged with the car wheels CW with greater force to thereby exert a greater retarding effect.

The above-described automatic compensation for cars of varying weight and loadings is achieved without any interference with the anti-derailing function of the car retarder of the present invention. Thus, should a car wheel somehow become pinched out of the guard members, the gage side member is effective to maintain a guarding action on the wheel flange while the wheel tread rolls along the upper surface of the field side guard member in the same manner as described in detail with reference to the form of the car retarder illustrated in FIGS. 1–5. Also, the specific disposition of the flared end portions of the guard members in the form of the car retarder illustrated in FIG. 8 assures accurate return of the car wheel to the traffic rail at the outlet end of the car retarder 101.

From the foregoing it will be apparent that weight compensation is achieved in the form of the car retarder illustrated in FIG. 8 by mechanism of quite simplified construction. This construction not only contributes to a simple and effective mode of operation but also facilitates initial installation of the car retarder on the traffic rails. In this regard, and after the shaft 146 has been assembled in the support members 107F in the manner described in detail hereinabove, a hydraulic jack may be used in combination with a direct reading gage for separating apart the respective pairs of guard members 102F—102G, 103F—103G both to insert the ramp bars 162 in place and to set the initial calibration of the car retarder retarding force. Thus, the guard members 103F and 103G may be spread apart a sufficient distance, as by a hydraulic jack, to enable the ramp bars 162 to be dropped into position on the supporting lugs 164 of the crank arms 162. Thereafter, the guard members are permitted to move inwardly toward one another under the biasing force exerted by the springs 108. By utilizing a direct reading gage as aforesaid the force exerted by the guard members at various spacings, corresponding to the various wheel widths of cars which may pass through the car retarder, can be determined and adjusted by suitable insertion or removal of shims as 48 (see FIG. 7) or the like between the springs 108 and the lever arms. Inasmuch as no downward deflecting force is exerted on the ramp bars 162 at such time, the resultant settings will correspond to the force exerted on a car wheel of an empty or very lightly loaded railroad car. Thus, the car retarder of the present invention may be set to exert only a retarding force of such magnitude as will not be lightly to cause an empty car wheel to be pinched out of the guard members. This is feasible because the weight compensation achieved by the downward movement of the ramp bars 162 by a heavily loaded railroad car enables a greater retarding force to be exerted on such heavily loaded cars. Considered from another viewpoint, the initial retarding force may be selected to insure entry of the car wheels of an empty or lightly loaded car within the car retarder.

In many instances the car retarder 101 will be installed for operation in a system wherein the railroad cars pass through the car retarder in only one direction. In such a case, the spring and lever arm assemblies 105 at the inlet end of the car retarder may be set to exert a relatively small retarding force while the spring and lever arm assemblies 105 at the center and outlet ends of the car retarder can be individually set to exert a greater retarding force. In this manner initial entry of the car wheels within the car retarder without the likelihood of being pinched out is further assured.

Another feature of the mode of operation of the car retarder of the present invention may be noted. In either the form of the car retarder as illustrated in FIG. 1 or FIG. 8, there may be some tendency for an empty car in effect to float between the guard members rather than ride on the traffic rail or the ramp bars, as the case may be. Thus, the frictional forces developed by the engagement of the guard members with the side surfaces of the car wheels may be sufficient to support the weight of an empty car. In such a case, it is all the more important to achieve the initial entry of the car wheel within the car retarder by the various procedures noted hereinabove, and the anti-derailing features of the car retarder of the present invention also contribute to successful operation of the car retarder. Moreover, the manner in which the lever arms and guard members are supported and disposed with respect to the traffic rails enables an additional compensating aspect of operation to be achieved. Thus, and as will be apparent from a consideration of FIGS. 5 and 11, a car wheel of an empty car engages the lower portions of the guard members at a smaller leverage with respect to the points of pivot of the lever arms than does a car wheel engaging the upper surfaces of the guard members. Therefore, a car wheel of an empty car in moving upwardly within the car retarder with respect to the surface of the traffic rail is engaged with a progressively smaller gripping force so that the tendency of the car retarder to pinch the car wheel out of the car retarder progressively decreases as the car wheel moves upwardly toward the critical portion of the car retarder guard members.

While a series of ramp bars 162 have been shown spaced along the longitudinal extent of the car retarder 101, a single continuous ramp bar extended uninterruptedly between the inlet and outlet ends of the car retarder is also contemplated by the present invention. The plurality of spaced ramp bars are however preferable in those instances wherein the car retarder is to be mounted on traffic rails of relatively low heights inasmuch as such an arrangement alleviates problems of fracture in the parts of the ramp bars immediately adjacent the spring and lever arm assemblies 105. That is, a single continuous ramp bar might necessarily be of such relatively small section in the portions extending over the support members 107 as to be subjected to over stressing by a heavily loaded car wheel rolling thereon if incorporated with traffic rails of relatively small height. However, with heavier and higher traffic rails, a single ramp bar could well be utilized.

Thus, the car retarder of this invention is of a relatively simple construction and utilizes a minimum number of parts but provides sufficient strength in the parts required to reduce the likelihood of part failure. The car retarder of this invention is entirely mechanical in its operation, is substantially tamper proof, and requires very little maintenance. The car retarder is effective to develop a predetermined decelerating action on each railroad car passing therethrough even though the widths of the wheels of the cars may vary. The manner in which the support members are bolted directly to the traffic rails as well as the projecting lug construction of these support members enable the car retarder to effectively resist any tendency to creep along the traffic rails as a result of the longitudinal thrust exerted by the car wheels thereon. Most importantly, the manner in which the different elements of the car retarder are interrelated enables the car retarder to function to prevent derailment of the railroad car as a result of a car wheel being pinched out of the car retarder. The component parts of the car retarder perform this antiderailing function not only at all points along the length of the retarder but also at the critical period at the end of the retarder when the car wheel must be returned to the traffic rail. And this return of the car wheel to the traffic rail is accomplished without the necessity of having resort to auxiliary and expensive wheel return apparatus such as has heretofore often been required.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. A car retarder of the kind described and comprising, a pair of support members each including a base bolted directly to opposite sides of the web of a railroad traffic rail and each including a pair of outwardly projecting lugs formed with pin receiving openings, said traffic rail having a base flange to be supported by ties, said base flange presenting upwardly disposed surfaces and said support members having bottom surfaces engaged with and supported by the upwardly disposed surfaces of the flanges of the traffic rail so that the rail flanges bear the weight of the car retarder, a pair of lever arms having pin-receiving openings formed therein, pin means disposed within said openings and pivotally supporting each of the lever arms at a location intermediate the ends thereof on one of the support members in a manner such that each of the lever arms extends generally vertically alongside the rail with a lower end portion projecting below said rail, the pin means having a smaller diameter than said openings in said lever arms so that said lever arms are rotatable to a limited extent about their longitudinal axes, guard members mounted on the lever arms at the upper ends thereof and disposed above the head of said traffic rail on opposite sides thereof so that there is a gage side guard member at the inside of the traffic rail and a field side guard member at the outside of the traffic rail, biasing means disposed between the lower portions of the lever arms for exerting a force on the lever arms and effective to rotate the arms about the respective pivotal connections to move the guard members toward one another so that said guard members are operative to grip a railroad car wheel rolling along said rail and thereby exert a retarding force on a railroad car, and connecting means extending between the lower end portions of the lever arms for limiting the extent of the movement of the guard members toward one another.

2. A car retarder according to claim 1 wherein the biasing means biases said guard members to a position wherein the gage side guard member guards the flange of a car wheel pinched from the retarder while the field side guard member supports the wheel tread with the car wheel disposed above the traffic rail.

3. A car retarder as defined in claim 1 wherein the end portion of the guard member on the field side of the traffic rail at the exit end of the retarder diverges to be spaced outwardly from the traffic rail a greater distance than the guard member on the gage side of the traffic rail to enable the wheel tread of a car wheel pinched from the retarder to pass from a supported position on the field side guard member to a supported position on the traffic rail while the gage side guard member guards the flange of the wheel.

4. A railroad car retarder for frictionally engaging opposite faces of a railroad car wheel to apply a decelerating force to the railroad car, said car retarder comprising, a pair of support members, each including a pair of outwardly extending support lugs, supported on opposite sides of a traffic rail, a lever arm including a head arranged between the lugs of each support member and extending generally vertically alongside and depending below the traffic rail, pivot means mounting each lever arm between such a pair of lugs and about a portion of said lever arm which is intermediate the ends thereof, said lever arms being thus disposed in opposed and paired relation on opposite sides of the traffic rail, the pivot means for one of said lever arms comprising a shaft having mounting portions journalled for rotation within said lugs, said shaft having a pivot portion between said lugs supporting said one lever arm for swinging movement thereon and which is eccentric with respect to the mounting portions of said shaft, guard members mounted on the heads of the lever arms and disposed above the head of the traffic rail, a compression spring disposed beneath the traffic rail and acting between the lower end portions of a pair of lever arms for rotating said lever arms about said pivot means to thereby bias the guard members toward one another and into gripping relation with the opposite faces of a railroad car wheel rolling along the traffic rail, connecting means including a tie bolt extending between the lower end portions of the lever arms for engaging the lever arms and limiting the extent of the movement of the guard members toward one another, and weight-responsive means responsive to the load carried by a car wheel gripped between said guard members for shifting the pivot portions of said lever arms toward one another to increase the biasing force exerted on the lower end portions of said lever arms by said compression spring, said weight-responsive means including a pair of crank arms affixed to the shaft for rotating the shaft, said crank arms having lugs extending toward the related rail, and a ramp bar interposed between the traffic rail and said one lever arm and movable in a vertical direction alongside the traffic rail, said bar having an upper portion normally projecting upwardly above the upper surface of the traffic rail for engagement with a railroad car wheel, said bar having a lower portion engaged with the crank lugs, whereby a car wheel is effective to depress the ramp bar and rotate the crank means and shaft a distance which is related to the load carried by the car wheel.

5. A car retarder of the kind to be utilized on railroad traffic rails for frictionally engaging opposite faces of the wheels of a railroad car and comprising for each rail, a pair of guard members adapted to extend along a portion of the length of the traffic rail on both the gage and field sides thereof, means for mounting the guard members for movement toward and away from one another, means for biasing said guard members to a first position wherein the guard members frictionally engage the opposite sides of a car wheel with the tread of the wheel supported on the head of the traffic rail and for biasing said guard members to a second position wherein the gage side guard member guards the flange of a car wheel while the field side guard member supports the wheel tread with the car wheel disposed above the traffic rail, the end portion of the guard member on the field side of each traffic rail being flared to space the same outwardly a greater distance from the traffic rail than the corresponding end portion of the guard member on the gage side of the traffic rail to enable the wheel tread of a car wheel, if pinched from the retarder, to pass from a supported position on the field side guard member to a supported position on the traffic rail while the gage side guard member guards the flange of the wheel.

References Cited in the file of this patent

UNITED STATES PATENTS

| | | |
|---|---|---|
| 1,647,575 | Nelson | Nov. 1, 1927 |
| 1,787,818 | Frolich | Jan. 6, 1931 |
| 1,840,250 | Prescott | Jan. 5, 1932 |
| 1,862,209 | Bone | June 7, 1932 |
| 1,906,359 | Begley et al. | May 2, 1933 |
| 2,009,953 | Brown | July 30, 1935 |
| 2,081,901 | Brown | June 1, 1937 |
| 2,104,606 | Bone | Jan. 4, 1938 |
| 2,238,772 | Clausen | Apr. 15, 1941 |
| 2,779,441 | Beltman | Jan. 29, 1957 |
| 2,947,385 | Devaney | Aug. 2, 1960 |

FOREIGN PATENTS

| | | |
|---|---|---|
| 144,033 | Australian | Oct. 1, 1951 |
| 51,856 | France | Feb. 15, 1943 |
| 638,588 | Great Britain | June 14, 1950 |